United States Patent [19]

Hubner

[11] 4,257,112
[45] Mar. 17, 1981

[54] ELECTRONIC TIME-PIECE WITH BAROMETRIC INDICATOR

[75] Inventor: Kurt Hubner, Neuchatel, Switzerland

[73] Assignee: Ebauches Electroniques S.A., Marin, Switzerland

[21] Appl. No.: 32,476

[22] Filed: Apr. 23, 1979

[30] Foreign Application Priority Data

Apr. 26, 1978 [CH] Switzerland .................. 4487/78

[51] Int. Cl.³ .................. G04B 47/00; G04B 47/06
[52] U.S. Cl. .................. 368/11; 73/754; 368/10
[58] Field of Search .............. 58/152 A; 73/384, 385, 73/386, 754, 170 R; 368/11

[56] References Cited

U.S. PATENT DOCUMENTS

| | | | |
|---|---|---|---|
| 3,124,004 | 3/1964 | Zenger | 73/386 |
| 3,355,949 | 12/1967 | Elwood et al. | 73/345 |
| 3,839,626 | 10/1974 | Klem et al. | 235/151.3 |
| 3,924,464 | 12/1975 | Cummins | 73/170 R |
| 4,101,838 | 7/1978 | Aihara et al. | 328/63 |

Primary Examiner—J. V. Truhe
Assistant Examiner—John B. Conklin
Attorney, Agent, or Firm—Wender, Murase & White

[57] ABSTRACT

The invention concerns an electronic time-piece having a barometric indicator, indicating, for example, barometric trends.

The time-piece comprises, in addition to the reference oscillator for determining the time, a measurement oscillator associated with a transducer exposed to the ambient air. A counter measures the variations of the frequency of the measurement oscillator due to the fluctuations of atmospheric pressure, and an electronic circuit controls, from predetermined detection thresholds, the indication of barometric trend on the display device of the time-piece.

18 Claims, 6 Drawing Figures

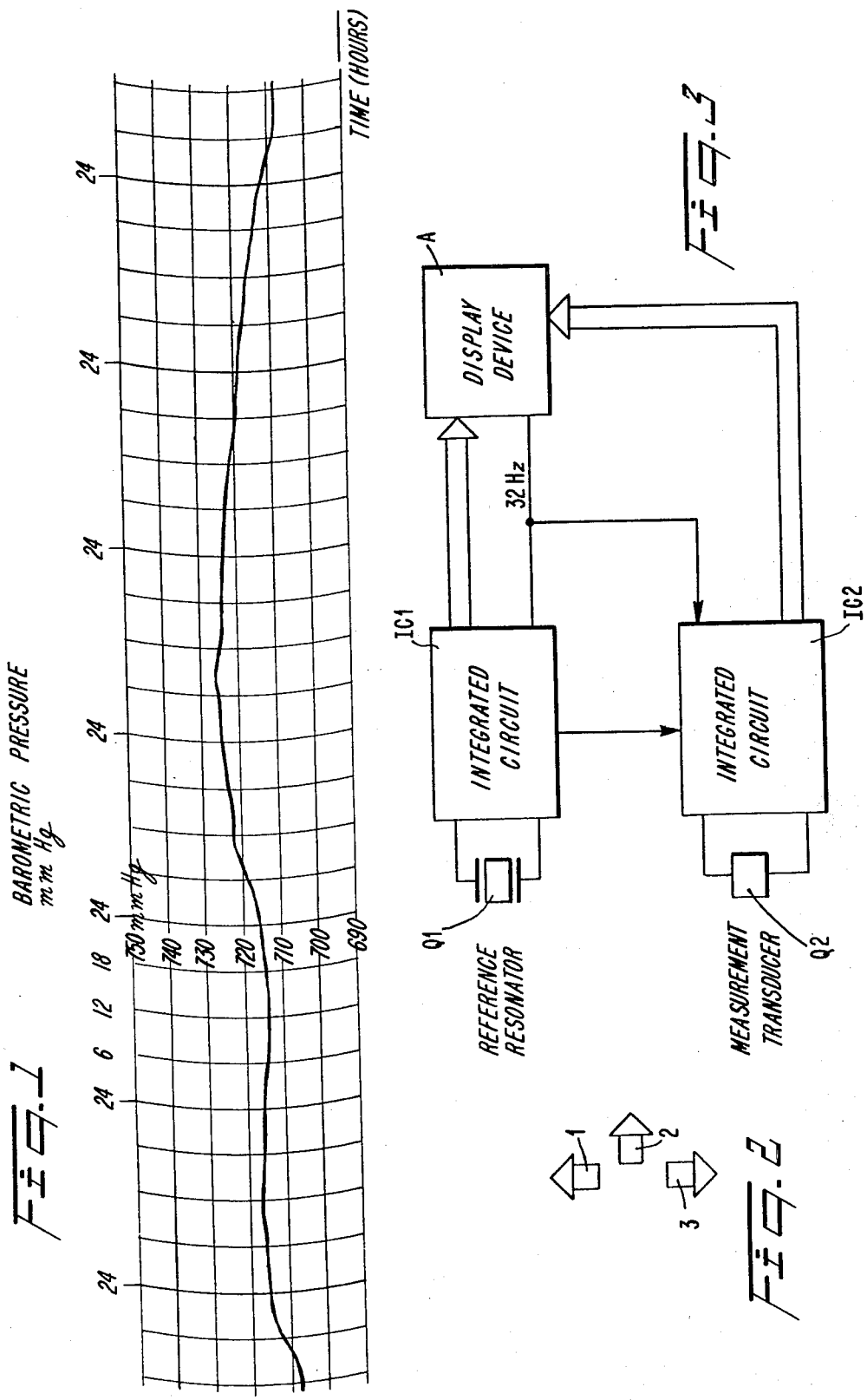

ELECTRONIC TIME-PIECE WITH BAROMETRIC INDICATOR

BACKGROUND OF THE INVENTION

The present invention concerns an electronic time-piece having an indicator for a barometric value, comprising a first oscillator associated with a reference resonator, a second oscillator for the measurement of the said barometric value, a frequency divider and a display device.

It is well known that the frequency of an oscillator equipped with a quartz resonator varies as a function of the atmospheric pressure if the resonator is exposed to the ambient air. It is therefore possible to utilize this phenomenon to obtain an indication of the barometric situation. In general, any transducer enabling a frequency variation to be obtained as a function of the variation of atmospheric pressure may be utilize, such as, for example, capacitive transducers or transducers with vibrating blades.

According to French Pat. No. 1492973, a process and an apparatus are known for measuring the pressure of vapor or the outflow of vapor in installations under vacuum. The pressure measurement circuit comprises a reference oscillator with a quartz resonator, and a measurement oscillator which is also fitted with a quartz resonator. The frequencies of both resonators are the same. However, the device does not determine either the barometric trends or the altitude, and its arrangement being at least partially analog in nature, would not permit its application to watch-making.

The object of the present invention is to provide a time-piece comprising a transducer reacting to atmospheric pressure, making it possible to give a barometric indication to the wearer. Thereof

SUMMARY OF THE INVENTION

According to the present invention there is provided an electronic time-piece having a barometric value indicator comprising a first oscillator associated with a reference resonator, a second oscillator for the measurement of the barometric value, a frequency divider, and a display device, wherein the second oscillator is associated with a measurement resonator. An electronic circuit is provided for determining variations, relative to the reference frequency of the first oscillator, of the frequency of the second oscillator, caused by the barometric influence on the measurement resonator, the electronic circuit further being capable of controlling the display of the barometric value on the said display device.

The invention will be described further by way of example with reference to the accompanying drawings.

BRIEF DESCRIPTION OF THE DRAWINGS

FIG. 1 is a representation of a barometric recording over a period of one week;

FIG. 2 is a diagrammatic representation of a display incorporating one embodiment according to the present invention which indicates the barometric trend;

FIG. 3 is a block diagram of one embodiment of a time-piece according to the present invention;

DESCRIPTION OF THE PREFERRED EMBODIMENT

Figure 4:
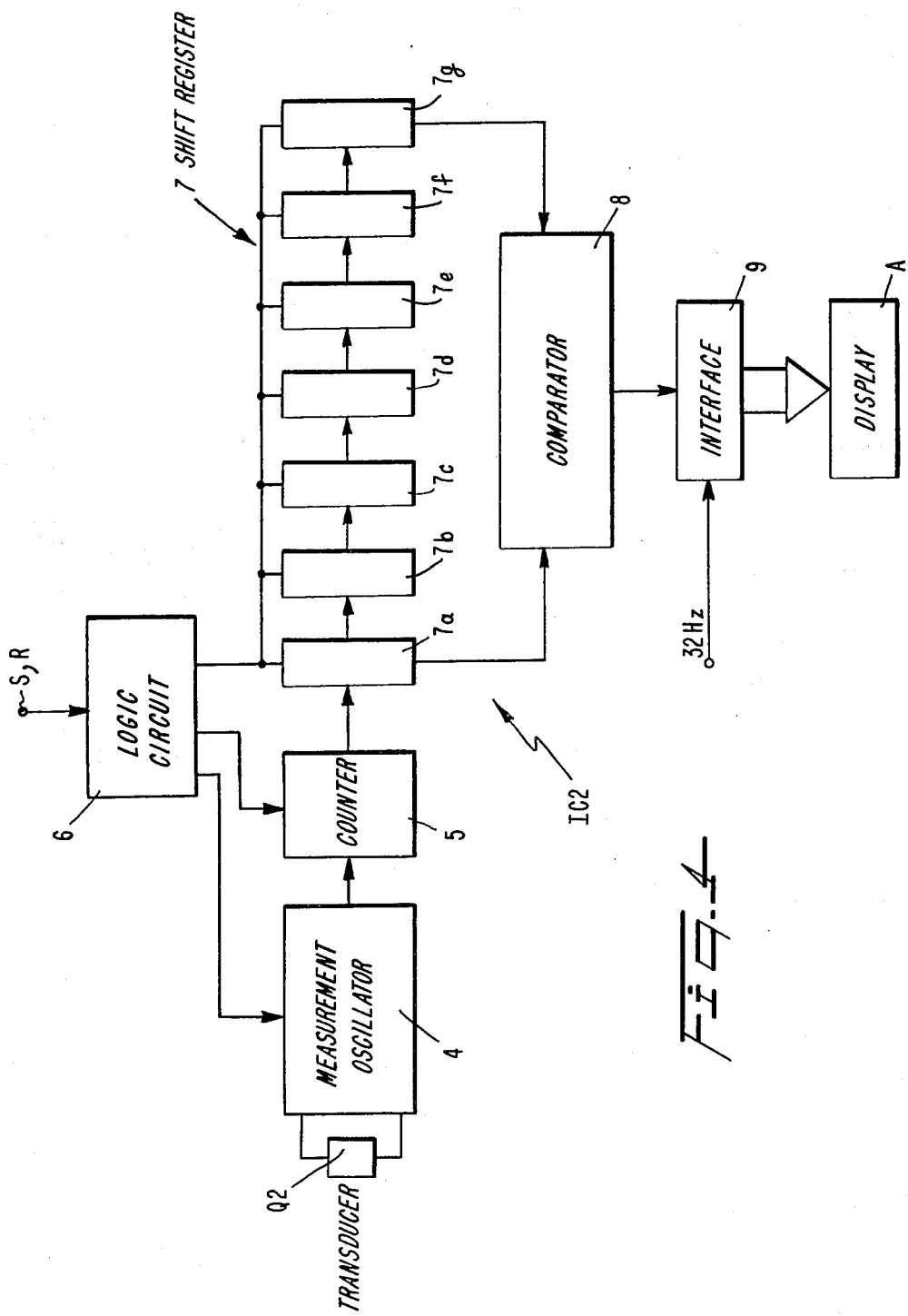
FIG. 4 is a block diagram of one embodiment of an integrated circuit of the barometric measurement system of the time-piece shown in FIG. 3.

FIG. 1 is an example of a barometric recording over a period of one week which illustrates the fact that the fluctuations of barometric pressure which influence the weather have a period at least equal to and generally greater than 24 hours. This fact is utilized in the time-piece in accordance with the invention for the measurement of barometric trends which are determined by a comparison, made over a time interval of 24 hours, of pressure measurements effected every 4 hours. Frequency measurements made with an oscillator fitted with a quartz crystal of the type used for time measurement being exposed to the ambient air, have enabled determination of the fact that sensitivity to atmospheric pressure is of the order of magnitude of 0.5 ppm/mm Hg. The variation in pressure therefore causes a corresponding variation of the frequency of the oscillator, and the determination of this frequency variation relative to the reference frequency of the oscillator used for time measurement is a measurement of the variation of atmospheric pressure. On the other hand, the sensitivity of the frequency measurement depends on the frequency of the quartz oscillator and the measurement period.

Thus, for example, with a quartz oscillator having a frequency of 32768 Hz and the measurement period being 1 minute, the frequency variation caused by a variation of atmospheric pressure of some tens of mm Hg may be expressed by a number of 7 to 8 bits. The preceding data illustrate the parameters on which the measurement of barometric trends are based.

FIG. 2 shows, by way of example, a system of arrows used to display barometric trends on an LCD digital display device of the time-piece. The system is composed of three arrows 1, 2 and 3. Arrow 1 is directed upwardly, arrow 2 is horizontal and arrow 3 is directed downwardly. The possibilities of display of this system are indicated as follows:

| Trend | Permanent Display | Detection threshold |
|---|---|---|
| | | mm Hg |
| stable pressure | arrow 2 | 0–4 |
| weak rise | arrows 1 and 2 | 4–12 |
| strong rise | arrow 1 | >12 |
| weak drop | arrows 2 and 3 | 4–12 |
| strong drop | arrow 3 | >12 |

The system comprising three arrows therefore makes it possible to display five different conditions for the barometric pressure trends. The detection thresholds necessary for determining the five conditions indicated are determined as a function of the measurement system employed, and they are indicated by way of example in the above table by the values of 4 and 12 mm Hg.

As an alternative, barometric trends may also be displayed by means of figures, and the signs plus and minus.

FIG. 3 is a block diagram of the electronic circuits of one embodiment of a time-piece according to the invention.

The circuit for determining the time, which is conventional, comprises a first integrated circuit IC1 having an oscillator associated with a reference quartz crystal Q1 in vacuum, and having frequency divider stages and circuits for controlling the display. The display A of the time-piece, described by way of example, is of the LCD type, and its common electrode receives a square signal of frequency 32 Hz. The time-piece includes, in addition, a second integrated circuit IC2 which comprises, among other things, an oscillator associated with the measurement transducer Q2 which is exposed to the ambient air. The circuit IC2, which will be described in greater detail in FIG 4, receives a synchronization signal from the circuit IC1 for the measurement of the frequency of the measurement oscillator, and the 32 Hz signal for the control of the display of the arrows of FIG. 2 indicating the barometric trend. The same display device is used both to indicate the time in digital form and, to indicate the barometric trend in symbolic form (arrows). This device has only one electrode common to all the digits and all the symbols.

It is also obviously possible to envision that the integrated circuits IC1 and IC2, separated in FIG. 3, could be combined in a single integrated circuit consolidating the watch function of IC1 and the barometric trend detection function of IC2.

FIG. 4 is the block diagram of one embodiment of the circuit IC2 of FIG. 3. The circuit comprises a measurement oscillator 4 associated with a transducer Q2. The oscillator 4 receives, from a logic circuit 6, a signal which periodically switches it on for a predetermined duration, for example, for a period of two minutes every four hours, so as not to appreciably increase the current consumption. During each period of working of the oscillator 4, a measurement of atmospheric pressure takes place. The output signal of the oscillator 4 is connected to a counter 5 utilized for the frequency measurement. To this end, a gate (not shown) situated at the input of the counter 5 is opened periodically with each measurement, by a signal delivered by the logic circuit 6, which is controlled by a synchronization signal delivered by the IC1 circuit (FIG. 3). It has already been seen that the opening period of the gate is one of the factors which determine the sensitivity of the measurement of frequency. By way of example, the gate is open for one minute, with each measurement, taken every four hours. Under these conditions, with each measurement the counter 5 counts the periods of the signal of the oscillator 4 for 60 seconds. It is also known that a number of 7 to 8 bits is sufficient to express the variations of the frequency produced by the extreme variations of atmospheric pressure, so that the capacity of counter 5 will be selected to be also of 7 to 8 bits, the last being, of course, the least significant of the frequency measurement. The output of the counter 5 is connected to the input of a shift register 7 composed of seven stages $7a$ to $7g$. Each stage has a storage capacity adapted to that of the counter 5, i.e., 7 to 8 bits in our example. All the stages receive in parallel, and periodically with each measurement, a control signal from the logic circuit 6. With each control pulse, the information advances by one stage to the right, so that if information is stored at the time $t=0$ in stage $7a$, it will move first into stage $7b$ upon the next control pulse, then into stage $7c$ and so on, until it reaches the last stage $7g$. If the control pulses, i.e. the measurement instants, follow each other at intervals of four hours, the information introduced at the time $t=0$ in stage $7a$ will reach stage $7g$ exactly 24 hours later. Hence, a frequency measurement (corresponding to a pressure measurement) is effected periodically, for example every four hours, and the result is memorized in the first stage $7a$ of the shift register 7. A comparator 8 determines the algebraic difference, in digital form, between the content of stage $7g$ and that of stage $7a$ of the shift register 7. Hence it determines, over an interval of time of 24 hours for example, according to the sign and the magnitude of this difference, the direction and the value of the variation of the atmospheric pressure, i.e. the barometric trend. The digital output signal of the comparator 8 is delivered to an interface 9, also receiving the 32 Hz control signal for the display. The interface 9 decodes the information at its input, and as a function of the predetermined detection thresholds, for example 4 and 12 mm Hg, delivers the signals necessary for the control of one or, simultaneously, of two of the arrows 1 to 3 of the barometric trend display. The arrows displayed are controlled by the pulse signals of frequency 32 Hz, in opposite phase relative to the 32 Hz signal on the common electrode.

It is also possible, without departing from the scope of the present invention, to imagine a display utilizing symbols of barometric trend different from the symbols indicated in FIG. 2, and to provide for the time indication via display which is not of LCD type.

What has been stated above concerns a device intended to determine and to display barometric trends. However, the oscillator 4 associated with the transducer Q2 of FIG. 4 delivers an output signal, the frequency of which depends on atmospheric pressure. It is therefore possible, without departing from the scope of the present invention, to utilize the information at the output of the oscillator 4 to measure, for example, altitude, i.e. an altimeter would then be associated with a time-piece.

Figure 5:
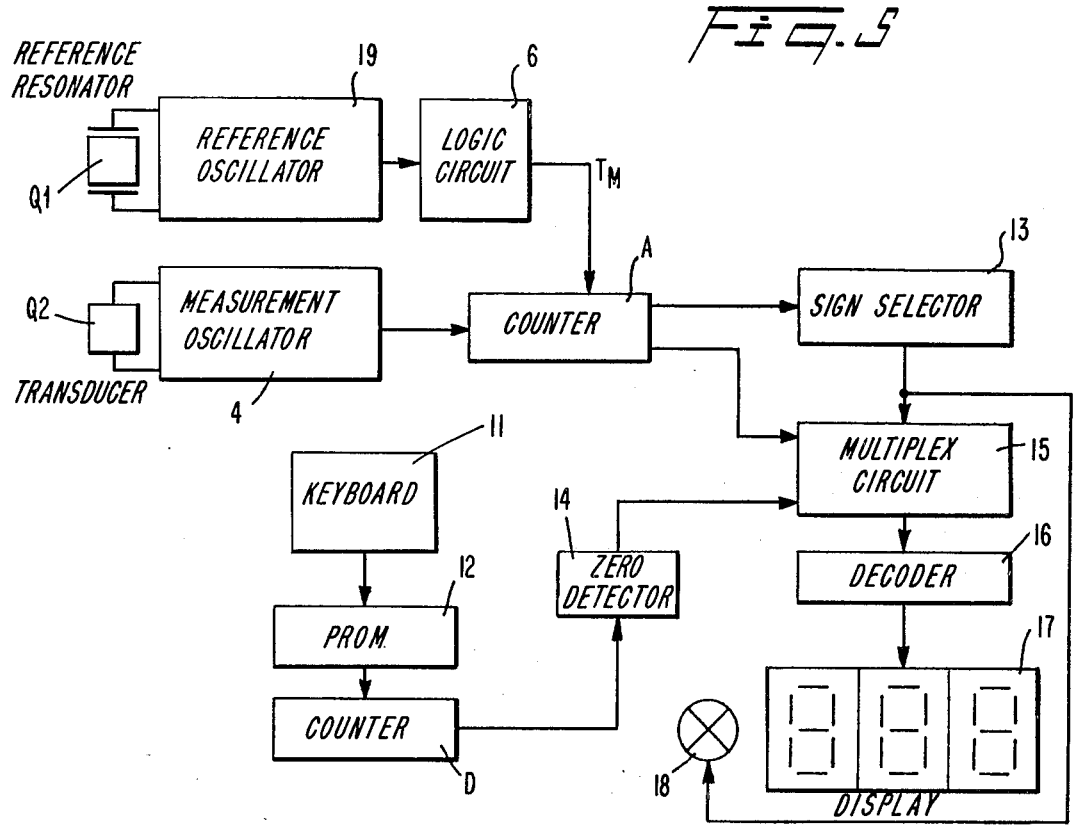
FIG. 5 is a block diagram of another embodiment of the time-piece according to the present invention which includes an altimeter.
Figure 6:
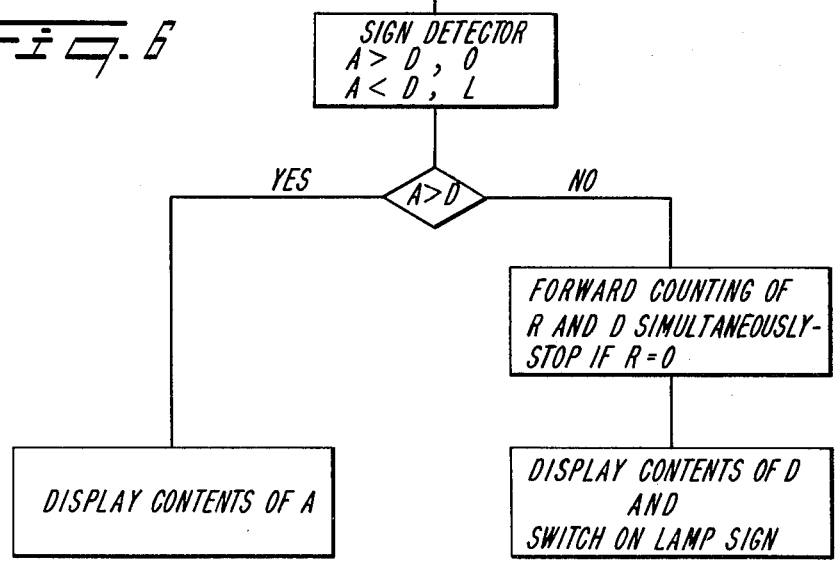
FIG. 6 is a logic flow diagram of a portion the program for the diagram of FIG 5.

The basic diagram of the part of the integrated circuit intended to measure altitude is that of FIG. 5. It is possible to recognize some of the parts of FIG. 4, such as the measurement oscillator 4 with the transducer Q2, the counter 5 (indicated by A in FIG. 5), and the logic circuit 6. Before any altitude measurements, it is necessary to regulate or calibrate the altimeter, so that the display 17 effectively indicates the known altitude of the starting location. This is in order to compensate for variations of atmospheric pressure at this location. For this purpose, a keyboard 11, operated manually for example, is used to introduce an item of information in digital form into a programmable memory 12. This information is in principle equal to the difference between the content of the counter A and the geographical altitude of the place of calibration. In order to more clearly understand the operation of the diagram shown in FIG. 5, let us examine its control logic, according to the following program:

1. Return the counter A to zero;
2. Count the signal of the measurement oscillator 4 during a measurement period $T_M$, a constant delivered by a logic circuit 6 from the reference oscillator 19;
3. Load the counter D with the contents of the programmable memory 12;
4. Count down simultaneously with counters A and D, and stop the count-down when the contents of the counter D is zero which is measured by zero detector 14. FIG. 6 is a logic flow diagram for continuation of the program of the diagram shown in FIG. 5.

It may be seen that the above program makes it possible to determine the algebraic difference (A−D).

During the calibrating period which the watch recognizes by a particular state of a function memory (not shown) the calculating sequence is accelerated in order to permit rapid calibration. Then, unlike the earlier described system for measurement of barometric trends, a pressure measurement will be frequently effected, e.g., every five minutes and/or on demand. If the altitude increases, the atmospheric pressure diminishes and the frequency of the measurement oscillator 4 increases. The frequency of the oscillator 4 is therefore proportional to the altitude, as is the case with the contents of the counter A, since the measurement period $T_M$ is constant. According to the logic state of the output of the sign selector 13, the multiplex circuit 15 sends information signals from the counter A or counter D to the decoder 16. The decoder 16 controls the display 17 which, in the example of FIG. 5, is represented by three digits with seven segments each. In this case, the variation by one unit of the least significant digit represents a variation of altitude, e.g., 10 meters. The signal lamp 18 is optional, and it may be used to indicate an increase (lamp off) or a decrease (lamp on) in altitude. It is obvious that the number of digits of the display 17 may be different from three, and that the display 17 and the lamp 18, indicating the magnitude and sign respectively, may be replaced by different displays and symbols without departing from the scope of the present invention.

I claim:

1. An electronic timepiece with a barometric value indicator, comprising:
   a reference resonator;
   a first electronic circuit coupled with said reference resonator for delivering reference frequency signals, sychronization signals, and time signals;
   a display device receiving said time signals for indicating the time;
   a measurement transducer exposed to the ambient air generating an output signal; and
   a second electronic circuit coupled with said measurement transducer, said display device, and said first electronic circuit, said second electronic circuit having means for delivering measuring frequency signals in response to said transducer output signal, and further having means for receiving said synchronization signals for periodically determining the variation of said measuring frequency relative to said reference frequency signals, said variation being caused by the barometric influence on said measurement transducer, said second electronic circuit controlling the display of the barometric value on said display device corresponding to said measuring frequency variation.

2. A time-piece according to claim 1, incorporating an altimeter, wherein said second electronic circuit includes an oscillator associated to said measurement transducer, said time-piece further comprising:
   means for measuring the frequency of said oscillator in response to said synchronization signal delivered by said first electronic circuit;
   a programmable memory for starting information signals;
   means for introducing information signals into said programmable memory, said information signals being a function of the geographical altitude of the place of calibration and of the actual barometric pressure at said place as measured by said means for measuring the frequency of said oscillator;
   means for determining the algebraic difference between the frequency of said oscillator and said information signals stored in said memory; and
   means for displaying the value of the sign of said difference.

3. A time-piece according to claim 1, wherein said second electronic circuit comprises:
   an oscillator coupled with said measurement transducer;
   a measurement counter for measuring the frequency of said oscillator;
   a shift register coupled to said measurement counter for storing and periodically transferring information signals received from said measurement counter;
   a comparator for determining the difference between said information signals at the input and at the output of said shift register and supplying a resulting signal; and
   an interface receiving said resulting signal and which, as a function of predetermined detection thresholds, controls the indications of the barometric trends on said display device.

4. A time-piece according to claim 3, wherein said oscillator is switched on periodically during a certain time on the occasion of each measurement of the frequency of said oscillator by said measurement counter.

5. A time-piece according to claim 4, wherein the period and the duration of working of the oscillator are determined by a signal supplied by a logic circuit, said logic circuit receiving a synchronization signal from said first electronic circuit.

6. A time-piece according to claim 3, wherein the measurement of the frequency of the oscillator by the measurement counter is effected periodically during a certain time, said measurement period and said measurement time being determined by a logic circuit from reference frequency signals delivered to said logic circuit by the first electronic circuit.

7. A time-piece according to claim 3, further comprising a logic circuit coupled to said shift register, said logic circuit on the occasion of each measurement, controls the shifting of information in said shift register.

8. A time-piece according to claim 3, wherein the capacity of said measurement counter is selected to be equal to a determined number among the least significant bits of the value of the frequency, said bits representing the extreme variations of the frequency produced by the extreme variations of the atmospheric pressure.

9. A time-piece according to claims 3 or 8, wherein the storage capacity of each of the stages of said shift register is equal to that of said measurement counter.

10. A time-piece according to claim 3, wherein comparator determines the algebraic difference, in value and in sign, between the information signals of the first and the information signals of the last stage of said shift register.

11. A time-piece according to claim 3, wherein the comparison between the information signals at the input and the information signals at the output of the register is made over a determined period of time, the duration of which is equal to the product of the measurement period by the number of stages of the register minus 1.

12. A time-piece according to claim 1, wherein said barometric value is the barometric trend, the indication of said barometric trend being made by means of symbols included in said display device associated with said time-piece.

13. A time-piece according to claim 12, wherein said indication is displayed by means of figures and the signs plus and minus.

14. A time-piece according to claim 12, wherein said symbols are arrows.

15. A time-piece according to claim 1, wherein said measurement transducer is a quartz crystal exposed to the ambient air.

16. A time-piece according to claim 1, wherein said measurement transducer is a capacitive transducer.

17. A time-piece according to claim 1, wherein said measurement transducer is a transducer with vibrating blades.

18. A time-piece according to claim 1, wherein said said display device is of the liquid crystal type (LCD).

* * * * *

UNITED STATES PATENT AND TRADEMARK OFFICE
CERTIFICATE OF CORRECTION

PATENT NO. : 4,257,112
DATED : March 17, 1981
INVENTOR(S) : KURT HUBNER

It is certified that error appears in the above—identified patent and that said Letters Patent is hereby corrected as shown below:

Column 5, line 63, "starting" should be

-- storing --.

Column 6, line 18, "determing" should be

-- determining --.

Signed and Sealed this

Twenty-third Day of June 1981

[SEAL]

Attest:

RENE D. TEGTMEYER

Attesting Officer

Acting Commissioner of Patents and Trademarks